Dec. 12, 1967    V. MILEWSKI    3,357,080
INDEXABLE INSERT TOOL HOLDER
Filed June 21, 1965
FIG.1
FIG.2
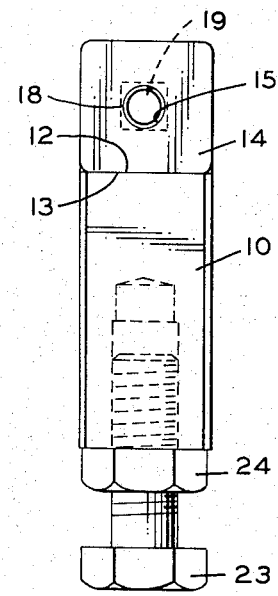
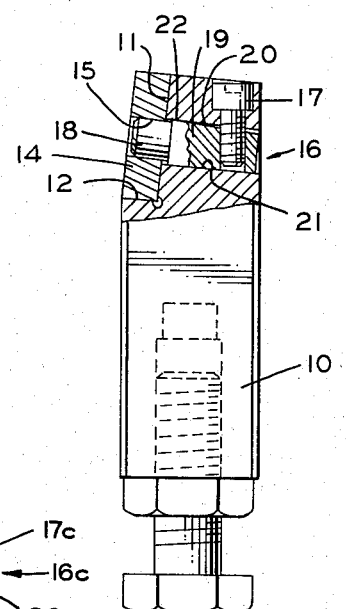
FIG.5
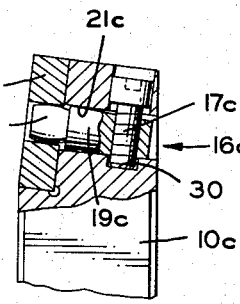
FIG.3
FIG.4
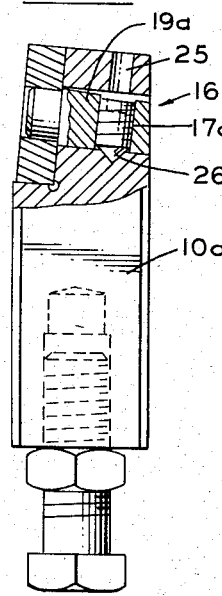
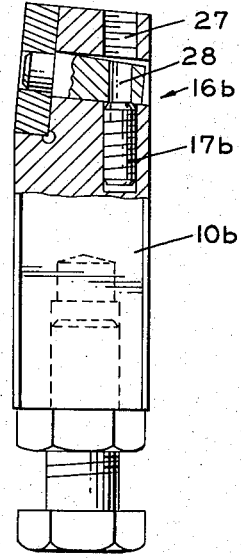
INVENTOR.
VICTOR MILEWSKI
BY Farley, Forster
and Farley
ATTORNEYS

United States Patent Office 3,357,080
Patented Dec. 12, 1967

3,357,080
INDEXABLE INSERT TOOL HOLDER
Victor Milewski, Birmingham, Mich., assignor to The Valeron Corporation, Detroit, Mich., a corporation of Michigan
Filed June 21, 1965, Ser. No. 465,586
6 Claims. (Cl. 29—96)

This invention relates to a tool holder and more particularly to a cartridge employing an indexable throwaway insert made of a wear resistant material such as tungsten carbide having a central hole and locking pin for engagement.

An important feature to which the present invention is directed is a locking pin which employs a leverage action for clamping actuated by a set screw adapted to provide a high degree of mechanical advantage as well as a compact, conveniently accessible actuating location. These and other objects and advantages of the invention will be best understood from the following detailed description of a preferred embodiment and two alternate constructions as disclosed in the drawings wherein:

FIG. 1 is a plan view of the preferred cartridge assembly;

FIG. 2 is a partially sectioned side elevation thereof;

FIG. 3 is a view similar to FIG. 2 showing a modified construction;

FIG. 4 is a view similar to FIGS. 2 and 3 showing a further modified construction; and FIG. 5 is a fragmentary sectional view showing a further modified construction.

With reference to the drawing the cartridge includes a body 10 having an insert pocket formed by a flat insert seating surface 11 and a shoulder 12 normal to the seating surface 11 extending across the full width of the body providing a back-up surface for engagement by one edge 13 of a square indexable throwaway tungsten carbide insert 14 having a central cylindrical hole 15 therein for engagement by a lever acting locking pin 16 actuated by a cap screw 17. The locking pin includes a cylindrical actuating head 18 adapted to closely fit the cylindrical hole 15 of the insert and a square shank portion 19 having one tapered surface 20 but otherwise adapted to closely fit the square hole 21 in the cartridge body extending through the end thereof normal to the seating surface 11.

The parts are dimensioned to provide bare or incipient engagement of the insert with the shoulder 12 and seating surface 11 with the set screw loosened and the square portion of the locking pin seated against the body wall opposite the taper 20 as shown in FIG. 2, so that upon tightening the screw 17 drawing the locking pin toward the seated head of the cap screw 17, the locking pin will act as a lever about the fulcrum point 22 forcing the cylindrical portion 18 down and the insert 14 into tight engagement with the back-up shoulder 12. When the actuating screw 17 is loosened the insert 14 may be removed and indexed to any one of eight positions.

Adjustment of the cartridge within a tool holder, such as a broaching bar or the like not shown, is provided by a cap screw 23 threaded into the cartridge body 10 and held in an adjusted position by a lock nut 24 in a conventional manner.

With reference to FIG. 3 a modified construction is shown wherein a threaded set screw 17a is entirely housed within a square portion 19a of the locking pin 16a and actuated by an "Allen head" wrench extending through access hole 25 in the end of the cartridge body 10a. In this case, the end 26 of the set screw presses against the cartridge body when tightened to force the lever upwardly.

With reference to FIG. 4 a threaded set screw 17b housed within the cartridge body 10b below the locking pin 16b after insertion through the aligned threaded passage 27 in the upper end of the body. In this case an Allen wrench may be passed through an access hole 28 in the locking pin to actuate the set screw 17b to force the lever in an upward direction.

With reference to FIG. 5 a conically tapered locking pin 19c is provided with a threaded hole for engagement by actuating screw 17c having its end bearing in a reaction recess 30, the head of the pin 18c being somewhat rounded to centralize actuating pressure on the insert 14.

Thus it is seen that various arrangements of actuating screws may be employed to produce a similar leverage action on the locking pin and it will be understood that other modifications might be resorted to without departing from the scope of the invention as defined in the following claims.

I claim:

1. An indexable insert tool comprising a tool body having a shouldered seat, an indexable insert having a central hole extending normal to said seat, a locking pin recess in said holder aligned with said central insert hole in assembled condition, a locking pin seated in said recess extending into said central insert hole, said locking pin having a clearance relative to said recess terminating at a fulcrum for engagement of said body, said locking pin having a square cross section configuration in the portion extending within the tool body, and means for actuating said locking pin to produce leverage forcing said indexable insert against the shoulder of said seat.

2. An indexable insert tool as set forth in claim 1 wherein said locking pin has a cylindrical portion extending within a matching hole in said indexable insert.

3. An indexable insert tool comprising a tool body having a shouldered seat, an indexable insert having a central hole extending normal to said seat, a locking pin recess in said holder aligned with said central insert hole in assembled condition, a locking pin seated in said recess extending into said central insert hole, said locking pin having a clearance relative to said recess terminating at a fulcrum for engagement of said body, and means for actuating said locking pin to produce leverage forcing said indexable insert against the shoulder of said seat, said actuating means comprising a cap screw seated in the end of said tool body having a threaded portion engaging a matching threaded hole in said locking pin.

4. An indexable insert tool comprising a tool body having a shrouldered seat, an indexable insert having a central hole extending normal to said seat, a locking pin recess in said holder aligned with said central insert hole in assembled condition, a locking pin seated in said recess extending into said central insert hole, said locking pin having a clearance relative to said recess terminating at a fulcrum for engagement of said body, and means for actuating said locking pin to produce leverage forcing said indexable insert against the shoulder of said seat, said actuating means comprising a set screw housed within a threaded portion of said locking pin.

5. An indexable insert tool comprising a tool body having a shouldered seat, an indexable insert having a central hole extending normal to said seat, a locking pin recess in said holder aligned with said central insert hole in assembled condition, a locking pin seated in said recess extending into said central insert hole, said locking pin having a clearance relative to said recess terminating at a fulcrum for engagement of said body, and means for actuating said locking pin to produce leverage forcing said indexable insert against the shoulder of said seat, said actuating means comprising a set screw housed within a threaded portion of said locking pin, an access hole for an Allen locking wrench to engage said set screw being provided in the end of said body.

6. An indexable insert tool comprising a tool body having a shouldered seat, an indexable insert having a central hole extending normal to said seat, a locking pin recess in said holder aligned with said central insert hole in assembled condition, a locking pin seated in said recess extending into said central insert hole, said locking pin having a clearance relative to said recess terminating at a fulcrum for engagement of said body, and means for actuating said locking pin to produce leverage forcing said indexable insert against the shoulder of said seat, said actuating means comprising a threaded set screw housed within a threaded portion of said body, an Allen head access hole being provided through said locking pin.

References Cited

UNITED STATES PATENTS

| | | | |
|---|---|---|---|
| 1,838,520 | 12/1931 | Archer | 29—98 |
| 3,137,059 | 6/1964 | Hertel | 29—96 |
| 3,289,272 | 12/1966 | Stier | 29—96 |

HARRISON L. HINSON, *Primary Examiner.*